United States Patent [19]
Benoit et al.

[11] Patent Number: 5,603,603
[45] Date of Patent: Feb. 18, 1997

[54] ABRASIVE BLADE TIP

[75] Inventors: Roland Benoit, Lake Park; Eugene M. Beverly, Palm Beach Gardens; Charles M. Love, Jupiter; Gregory J. Mack, Palm Beach Gardens, all of Fla.

[73] Assignee: United Technologies Corporation, Hartford, Conn.

[21] Appl. No.: 455,786

[22] Filed: May 31, 1995

Related U.S. Application Data

[62] Division of Ser. No. 164,048, Dec. 8, 1993, abandoned.

[51] Int. Cl.$^6$ .................................................. F01D 5/14
[52] U.S. Cl. ................... 415/173.4; 415/174.4; 277/53; 416/241 B
[58] Field of Search ............................ 416/241 R, 241 B; 415/173.4, 174.4; 277/53, 55, 56; 428/220

[56] References Cited

U.S. PATENT DOCUMENTS

| | | | |
|---|---|---|---|
| Re. 31,883 | 5/1985 | Bovenkerk et al. | 51/295 |
| 3,199,836 | 8/1965 | Moyer | 253/77 |
| 3,899,267 | 8/1975 | Dennis et al. | 416/92 |
| 4,169,020 | 9/1979 | Stalker et al. | 204/16 |
| 4,232,995 | 11/1980 | Stalker et al. | 415/172 A |
| 4,249,913 | 2/1981 | Johnson et al. | 415/173.4 |
| 4,269,903 | 5/1981 | Clingman et al. | 415/173.4 |
| 4,589,823 | 5/1986 | Koffel | 415/173.4 |
| 4,608,128 | 8/1986 | Farmer et al. | 204/16 |
| 4,689,242 | 8/1987 | Pike | 415/173.4 |
| 4,735,656 | 4/1988 | Schaefer et al. | 75/238 |
| 4,744,725 | 5/1988 | Matarese et al. | 415/173.4 |
| 4,802,828 | 2/1989 | Rutz et al. | 416/241 B |
| 4,851,188 | 7/1989 | Schaefer et al. | 419/19 |
| 4,884,820 | 12/1989 | Jackson et al. | 416/241 B |
| 5,024,884 | 6/1991 | Oftinoski | 415/174.4 |
| 5,074,970 | 12/1991 | Routsis et al. | 205/122 |
| 5,076,897 | 12/1991 | Wride et al. | 205/110 |
| 5,104,293 | 4/1992 | Eaton, Jr. et al. | 416/241 B |
| 5,355,637 | 10/1994 | Wiltshire et al. | 51/295 |

FOREIGN PATENT DOCUMENTS

| | | | |
|---|---|---|---|
| 0181258 | 5/1986 | European Pat. Off. | C04B 35/58 |
| 2048927 | 12/1980 | United Kingdom | C09K 3/14 |

*Primary Examiner*—Edward K. Look
*Assistant Examiner*—Mark Sgantzos
*Attorney, Agent, or Firm*—Christine M. Wilkes

[57] ABSTRACT

An improved abrasive blade tip for gas turbine engines is taught, wherein an abrasive tip coating is applied to the blade tip in such a manner as to lessen wear through of the abrasive and the underlying airfoil on the leading and trailing edges, by coating the blade tip with abrasive not only on the tip surface per se, but so as to cover portions of the convex and concave airfoil surfaces at the corners where the tip surface intersects the leading and trailing edges.

8 Claims, 1 Drawing Sheet

ABRASIVE BLADE TIP

DESCRIPTION

This is a division of application Ser. No. 08/164,048 filed on Dec. 8, 1993 (now abandoned).

TECHNICAL FIELD OF THE INVENTION

This invention relates to a an abrasive blade tip component of a gas seal structure for a gas turbine engine. More particularly, the invention relates to an improved abrasive compressor or turbine blade tip, particularly for use with hard, smooth, non-porous abradable seals.

BACKGROUND OF THE INVENTION

In the compressor and turbine sections of gas turbine engines, blades rotate about the axis of the engine. The blade tips come in proximity to the inner wall of the engine case, frequently rubbing the case wall, or an abradable seal or rubstrip located on the case wall. Engine efficiency depends to a significant extent upon minimizing leakage by control of the gas flow in such a manner as to maximize interaction between the gas stream and the moving and stationary blades. A major source of inefficiency is leakage of gas around the tips of the compressor blades, between the blade tips and the engine case or seal means. In the highly competitive gas turbine business, there is a strong emphasis on providing closer tolerances as a means to achieve greater efficiencies. Although a close tolerance fit may be obtained by fabricating the mating parts to a very close tolerance range, such a fabrication process is extremely costly and time consuming. Further, when the mated assembly is exposed to a high temperature environment and high stress, as when in use, the coefficients of expansion of the mating parts may differ, thus causing the clearance space to either increase or decrease. The latter condition would result in a frictional contact between the blades and the housing, causing elevation of temperatures and possible damage to one or both members. On the other hand, increased clearance space would permit gas to escape between the blade and housing, thus decreasing efficiency.

One means to increase efficiency is to apply a coating of suitable material to the interior surface of the housing, to reduce leakage between the blade tips and the housing. Various coating techniques have been employed to coat the inside diameter of the housing with an abradable coating which can be worn away by the frictional contact of the rotating blade, to provide a close fitting channel in which the blade tip may travel. Thus, when subjecting the coated turbine assembly to a high temperature and stress environment, the blade and the case may expand or contract without resulting in significant gas leakage between the blade tip and the turbine housing. This abradable coating technique has been employed to not only increase efficiency, but to also provide a relatively speedy and inexpensive method for restoring excessively worn turbine engine parts to service.

To extend the life of the blade tips which rub against the abradable seals, abrasive layers are sometimes applied to the blade tip surface by a variety of methods. See, for example, U.S. Pat. No. 4,802,828, of Rutz et al, which suggests several techniques for providing an abrasive layer on a blade tip, including powder metallurgy techniques, plasma spray techniques, and electroplating techniques; Schaefer et al, U.S. Pat. No. 4,735,656, which teaches application of an abrasive comprising ceramic particulates in a metal matrix by controlled melting and solidification of the matrix metal; or, Schaefer et al, U.S. Pat. No. 4,851,188, which teaches a sintering operation for application of an abrasive layer to the tip of a superalloy gas turbine blade.

Electroplating techniques have been previously used for the deposition of abrasive layers to blade tips, as illustrated in Routsis, et al, U.S. Pat. No. 5,074,970, which teaches entrapment of nonconductive particulates within a layer of nickel upon the surface of a compressor blade by electroplating nickel onto a titanium airfoil, submerging the blade tip in a slurry of the particulate in a nickel plating solution, and electroplating a layer of nickel about the particulates in contact with the blade tip surface to encapsulate them in place. Similarly, U.S. Pat. No. 4,608,128, of Farmer et al, relates to deposition of nonconductive particulates on a substrate by applying to the blade tip a nonconductive tape carrying the particles, and electrodeposition of a metallic coating through pores in the tape onto the blade surface and about the abrasive particles, followed by removal of the tape so as to leave the particles on the blade surface, held in place by the electrodeposited metallic coating.

In Stalker et al, U.S. Pat. No. 4,169,020, an abrasive tip is produced by electrodepositing the metal matrix while concurrently entrapping abrasive particles included in the electroplating solution. In this reference, particles are deliberately left protruding from the matrix by limiting the matrix thickness. Wride et al, in U.S. Pat. No. 5,076,897, teach application of a binding coat on the tip of a blade body by electrodeposition, followed by composite electrodeposition of particulate abrasive and an anchoring metal matrix, followed by plating an infill around the abrasive particles.

However, it has been found that in normal use, abrasively tipped compressor blades show wear, erosion, and actual breakage, often referred to as notching, at the points where the blade tip surface intersects the leading edge and the trailing edge of the blade. This portion of the compressor blade, which is normally quite thin, is subject to wear and breakage where said edges contact the abradable coating or rubstrip portion of the gas turbine seal. This has been particularly noted in seal systems which employ relatively hard, smooth, non-porous abradable coatings, such as those comprising plasma sprayed oxidation resistant metal matrix seals containing a lubricating amount of hexagonal boron nitride particulate, or Filled Feltmetal (FFM) abradable rubstrips.

Accordingly, it is an object of the present invention to provide an improved abrasive compressor or turbine blade tip which contributes to engine efficiency by withstanding wear and erosion, and decreasing air flow around the leading and trailing edges. It is a further object of this invention to provide a compressor or turbine blade tip having extended life and reliability due to its resistance to notching. It is also an object of the present invention to provide an improved abradable seal/abrasive blade tip combination, which contributes to engine efficiency, reliability, and durability, by providing a compressor seal, which while abradable and smooth, is impermeable to gas flow, in combination with a highly abrasive blade tip which is itself resistant to erosion and wear.

SUMMARY OF THE INVENTION

The present invention comprises an improved abrasive blade tip, wherein the abrasive tip coating is applied to the blade tip in such a manner as to lessen wear through of the abrasive and the underlying airfoil on the leading and trailing edges. In accordance with the present invention, the blade tip is coated with abrasive not only on the tip surface per se, but so as to cover portions of the convex and concave airfoil surfaces at the corners where the tip surface intersects the leading and trailing edges. In a preferred embodiment, the blade tip is provided with an abrasive coating comprising cubic boron nitride (CBN), with the abrasive coating overplated on the leading and trailing edges so as to apply CBN to the convex and concave surfaces of the airfoil as well as to the tip. In combination with a smooth, non-porous lubricated seal, the present invention provides compressor and turbine blades which are not subject to notching at the leading and trailing edges due to rubbing or vibratory contact with the seal or the turbine case, which yield a smoothly cut groove which becomes smoother with use, and yield an unanticipated increase in efficiency, as well as greater operating life and reliability.

BRIEF DESCRIPTION OF THE DRAWING(S)

FIGS. 1 and 2 are simplified views of a compressor blade, illustrating the tip areas which are subject to application of abrasive material in accordance with the present invention.

DESCRIPTION OF THE PREFERRED EMBODIMENTS

Figure 1:
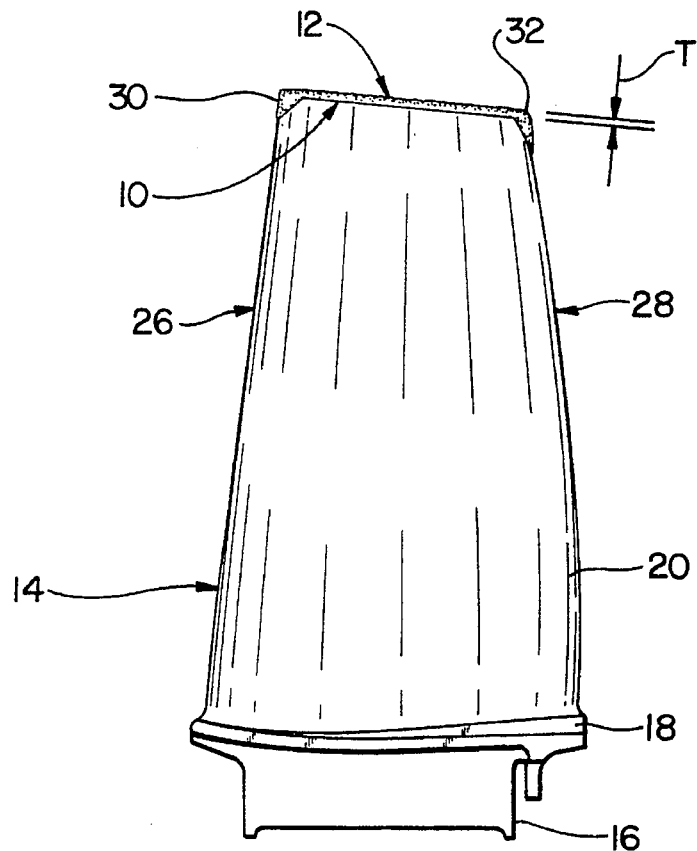

The present invention relates to seals and abrasive blade tips having particular utility in gas turbine engines, particularly those of the axial flow type. Such engines include alternate rows of stationary vanes and moving blades with the blades being attached at the periphery of shaft mounted rotating disks. The tips of such blades, which typically contact seal coatings or rubstrips mounted on the shroud or outer case of the engine, are designed to cut into the material of the seal mechanism, to thereby form a circumferential channel for movement of the blade tip, thereby increasing resistance to air flow or leakage. The requirements for abradable seals for gas turbine engines include abradability, spall resistance, and erosion resistance. In addition, due to increasing demand for improved performance, economy, and durability, improvements in abradable seals to limit permeability through the seal itself have been sought, as well as smooth surfaces and oxidation resistance at high temperatures. In achieving these goals, by providing seals which are hard, smooth, and non-porous, and contain a lubricant, greater loads are placed upon the cooperating blade tips, resulting in increased wear of the abrasive blade tip coating, particularly in the areas of the leading and trailing edges. It has now been found that by carefully controlling the size of the abrasive particulate to utilize the largest abrasive applicable to the specific blade tip, and by overplating the blade tip so as to apply abrasive to the leading and trailing surfaces of the blade and to contiguous areas of the convex and concave surfaces of the airfoil, as well as to the tip itself, a more efficient and durable blade tip may be obtained. This configuration may be referred to as a "leading edge, trailing edge, end cap" blade tip configuration. This configuration has the effect of thickening the thin leading and trailing edges of the blade, making them act more like the blade tip mid-section. Without the "leading edge, trailing edge, end cap" configuration, chipping of the CBN coating at leading and trailing edge locations is a problem, leading to increased gas leakage around the blades, while with the end caps, this chipping has not been found.

Various types of compressor and turbine blades to which the present invention is applicable have been described in the prior art. Such blades may conventionally be made of a cobalt or nickel superalloy, especially a single crystal nickel superalloy, titanium, or a titanium alloy. The invention has shown to be particularly applicable to titanium base alloy blades, including but not limited to the following compositions: Ti-3Al-2.5V; Ti-6Al-4V; Ti-8Al-1V-1Mo; Ti-6Al-2Sn-4Zr-6Mo; and Ti-6Al-2Sn-4Zr-2Mo. The blade tip abrasive coatings of the present invention may be applied to the blade by such methods as electroplating, plasma spraying, powder metallurgy techniques, laser welding, and brazing. Conventionally, the abrasive blade tip is applied to the blade by electroplating, with careful control of the plating area by such means as masking, to apply the abrasive coating material only to the tip of the blade, and to avoid application of any abrasive or plating material to the leading or trailing surfaces of the blade, or to the convex or concave surfaces of the airfoil. The present invention, however, contemplates the deliberate placement of abrasive coating material on the airfoil surfaces in the corner areas where the leading and trailing edges of the blade intersect the blade tip surface.

Figure 2:
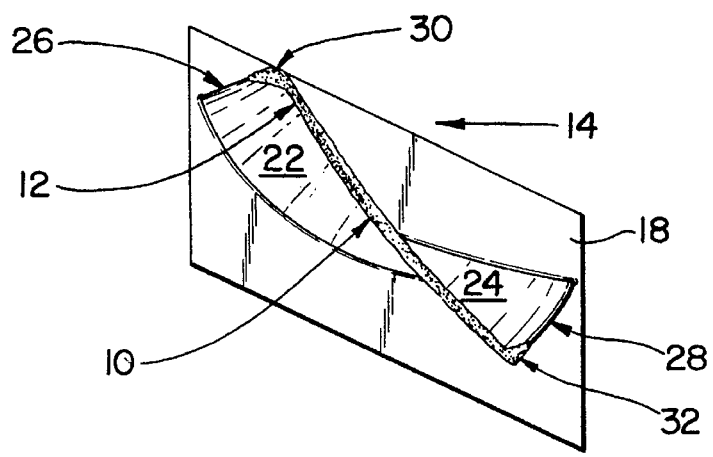

Procedures for application of an abrasive layer onto a blade tip comprise a number of interrelated steps, many of which involve contacting the blade with reactive chemicals. Surfaces which should be protected from such chemicals are first shielded with tape, lacquer, wax or other such removable masks, which may be applied to the entire blade surface. The masking material may then be stripped from the tip surface and the leading and trailing edges of the blade adjacent the tip, as shown in FIG. 1 and 2, so as to permit deposition of the abrasive layer in the desired areas. Shown are simplified views of a conventional compressor blade, 14, having a tip surface 10 upon which is located an abrasive layer 12, having a thickness T, applied in accordance with the present invention. The blade has a root portion 16, a platform 18, and an airfoil section 20 having convex surface 22 and concave surface 24, as well as leading edge 26 and trailing edge 28. As illustrated, the abrasive layer 12 is applied to the convex and concave surfaces of the airfoil 20 in corner areas 30 and 32, at the intersections of the blade tip surface 10 with the leading edge 26, and trailing edge 28, respectively. The thickness, T, of the abrasive coating may vary in accordance with the specific blade coated, the dimensions thereof, and the size of the abrasive particulate applied, but for a compressor blade may typically be from about 3 to 7 mils, and preferably about 4 to 6 mils.

The blade 14 preferably is of titanium, as previously indicated, but may be a nickel superalloy composition. In the case of a nickel superalloy blade, the blade preferably has a single crystal microstructure, although the invention is equally useful with blades that have a columnar grain or equiaxed grain microstructure. The abrasive layer 12 of this invention is characterized by a uniform distribution of abrasive particulates, i.e. cubic boron nitride, CBN, within a high temperature metal alloy matrix. While the diameter of the abrasive CBN particulate may be as small as 2.75 mils (200 to 230 mesh), larger particulate CBN is generally preferred, and a diameter of up to 8.75 mils (60 to 80 mesh) or larger is acceptable. When used in conjunction with a smooth, non-porous seal containing a lubricating amount of hexagonal boron nitride, it has been found that the use of smaller CBN in the abrasive tip layer results in excessive heating and cracking, particularly in the back stages of the engine, where operating temperatures are higher. Aside from economic factors, the larger size particles being less expensive, the larger size abrasives reduce load, and thus temperature and blade wear, resulting in greater reliability and engine life and efficiency.

While the present invention is disclosed herein relative to titanium blades, it is to be noted that the invention is not so limited, and may be applied to blades of nickel superalloys, for example, as stated hereinbefore. Likewise, while a preferred metal matrix material for the abrasive coating is disclosed, other suitable materials may also be utilized. Similarly, while the use of CBN particulate abrasive is exemplified, it is to be noted that the use of other abrasive materials, including but not limited to alumina and alumina-zirconia, is possible.

Conventional cleaning and preparation of the blade tip prior to application of the abrasive layer should, of course, be conducted. In the practice of the present invention, for example with a blade tip as shown in the figures, the surface of the blade tip is cleaned to enhance adherence of subsequently applied metallic coating materials. Such cleaning can include mechanical abrasion such as through a vapor or air blast type process employing dry or liquid carried abrasive particles impacting the surface. Other cleaning methods which can be used include ultrasonic water rinsing, electrolytic cleans, such as in acid baths to anodtcally or cathodically clean the article surface, etc. Selection of such state of the art cleaning methods, involving one or more combinations of steps, can be made according to the condition and type of article surface to which the abrasive particles are to be applied.

Prior to cleaning the surface, masking should be done to avoid application of the metallic matrix and abrasive particles to areas other than those desired. In the present invention, such masking should be applied so as to permit application of the abrasive coating to the blade tip surface and to the corner areas 30 and 32 of the airfoil. Thus, the masking should permit application of the abrasive to not only the tip surface itself, but also to the corner portions of the leading and trailing edges (26, 28) contiguous to the tip surface (10), which portions would be subject to "notching" upon use of the blade. This provision of an end cap for the leading and trailing edges results in much reduced wear of the abrasive blade tip, by strengthening the tip in areas subjected to extreme wear, stress, and erosion. While it is not necessary to extend the leading edge, trailing edge, end cap for the full length of the leading and trailing edges, the cap should extend for a distance of from about 0.025 to 0.100 inches from the corner of the blade, and preferably should protect the sides of the respective edges for a distance of about 0.050 inches from the corner of the blade. While the shape is preferably triangular, as shown in the figures, it may also be semi-circular, square, rectangular, etc. The purpose of this end cap is to protect the leading and trailing edges (26, 28), and the convex and concave surfaces, for that distance from the intersection of the blade tip surface and the leading and trailing edges which is subjected to the highest stresses upon operation of the engine. It has been found that the highest stresses are concentrated at the blade tip corners, extending toward the center of the blade tip and along the leading and trailing edges for a distance of up to about 0.100 inches.

The abrasive tip coating of the present invention may be applied, as indicated, by a number of suitable application techniques, but preferably by electrodeposition, as taught by Routsis et al, U.S. Pat. No. 5,074,970, incorporated herein by reference. This preferred application method for a titanium blade comprises cleaning the blade tip, leading edge, and trailing edge surfaces by grit blasting and acid rinsing, applying a thin layer of essentially pure nickel by electroplating to a thickness of between about 12 and 18 microns, and heat treating to enhance bond strength between the plating and the substrate. A second nickel layer (a nickel strike) is then electroplated onto the first nickel layer, which is activated prior to application of the nickel strike by use of a conventional acid etch. The purpose of the nickel strike is to encourage formation of a third nickel layer having high integrity, which is applied by immersion of the nickel plated titanium blade in a nickel plating solution for sufficient time to commence electrodeposition of nickel, followed by submersion of the component in a slurry of plating solution and particulates, and deposition of nickel and particulate. This may be accomplished, for example, by positioning the component in a conventional plating tank containing plating solution and an internal box defined by sidewalls and a bottom wall, said box containing the particulate slurry in plating solution, such that the component is first in contact with only the plating solution, and then lowering the component into the internal box so as to bring it into contact with the particulate slurry, as set forth by Routsis et al, U.S. Pat. No. 5,074,970. A fourth nickel layer may then be electroplated over the third, so as to embed the particulates in nickel without fully covering them. The thus coated blade may then be heat treated so as to cause diffusion between the first nickel layer and the titanium blade tip. While this application method may be utilized for the deposition of various abrasive materials of differing sizes, for use on blades to be used in conjunction with a hard, smooth, non-porous seal, the abrasive of choice is cubic born nitride, with a particle size distribution of from about 100 to 120 mesh.

An understanding of the present invention will be enhanced by the following illustrative examples.

EXAMPLE 1

Various compressor blades, having tips to which abrasive coatings were applied, were tested in a rub rig to determine effectiveness against a smooth, hard, non-porous composite seal designated as PWA284, comprising a metallic substrate, an adherent bond coat of an oxidation resistant superalloy, and a homogeneous abradable layer plasma sprayed over said bond coat, said abradable layer comprising 50 to 65 volume percent oxidation resistant superalloy, 20 to 45 volume percent hexagonal boron nitride, and less than 25 volume percent porosity. Abrasive tip coatings of aluminum oxide/zirconium oxide (Al/Zr), aluminum oxide ($Al_2O_3$), and CBN were run in order to determine such factors as incursion rate (IR), i.e., the rate at which the blade cuts into the seal, in mils per second; total blade wear, in mils; rub depth, in mils; and the blade and seal temperatures. The rub tests were done at a blade tip speed of 1100 feet per second to simulate operational conditions, and demonstrated that the CBN coated blade tips exhibited low incursion rates and more uniform rub depth, thus promising better seal cutting, and longer blade life. The results of these tests, demonstrating the superiority of the CBN abrasive, are set forth in Table I.

TABLE I

PWA284 SMOOTH SEAL RUB RIG RESULTS

| Test No. | Seal Coat Mat'l | Bulk Dens | Tip Treat | Tip Speed | I/R | Blade Wear | Rub depth | Blade Temp | Seal Temp |
| --- | --- | --- | --- | --- | --- | --- | --- | --- | --- |
| C0-01 | PWA284 | 4.5 | Al/ZR | 1100 | 0.1 | 7.5 | 20 | 1725 | 2350 |
| C0-05 | PWA284 | 4.82 | Al/ZR | 1100 | 0.1 | 8 | 11.5 | 2050 | 300 |
| C0-06 | PWA284 | 4.53 | Al/ZR | 1100 | 0.1 | 8.2 | 9 | 2315 | N/a |
| C0-19 | PWA284 | 4.64 | Al/ZR | 1100 | 1 | 4.8 | 13 | 1905 | 2385 |
| C0-13 | PWA284 | 5.12 | Al/ZR | 1100 | 0.1 | 0.8 | 21 | <1350 | 1615 |
| C0-14 | PWA284 | 4.82 | Al/ZR | 1100 | 1 | 3 | 16 | 1740 | 2370 |
| C0-17 | PWA284 | 4.7 | Al/ZR | 1100 | 0.1 | 2.5 | 15 | 1655 | 2195 |
| C0-18 | PWA284 | 4.7 | Al/ZR | 1100 | 0.1 | 6.9 | 13 | 1730 | 2380 |
| C0-29 | PWA284 | 4.7 | Al/ZR | 1100 | 1 | 3 | 20 | 1930 | 2290 |
| C0-28 | PWA284 | 4.7 | Al/ZR | 1100 | 0.1 | 4.3 | 13 | 1760 | 2250 |
| C0-20 | PWA284 | 4.35 | CBN | 1100 | 1 | 0.3 | 22 | <1350 | <1350 |
| C0-21 | PWA284 | 4.7 | CBN | 1100 | 0.1 | 0.3 | 20 | <1350 | <1350 |
| C0-30 | PWA284 | 5.1 | CBN | 1100 | 1 | 0.7 | 21 | 1630 | 1918 |
| C0-27 | PWA284 | 4.97 | CBN | 1100 | 10 | 0.6 | 20 | 1800 | 2148 |
| C0-26 | PWA284 | 5.1 | CBN | 1100 | 10 | 0.2 | 20 | 1870 | 2185 |
| C0-38 | PWA284 | 4 | CBN | 1100 | 2 | 1.4 | 20 | 1350 | <1350 |
| C0-08 | PWA284 | 4.82 | CBN | 1100 | 0.1 | 0.4 | 27 | 2355 | 2915 |
| C0-12 | PWA284 | 4.82 | CBN | 1100 | 10 | 0.2 | 20 | <1350 | <1350 |
| C0-37 | PWA284 | 4 | CBN | 1100 | 10 | 0.05 | 22 | <1350 | 1730 |
| C0-65 | PWA284 | 4.6 | CBN | 1100 | 10 | 0.05 | 23 | <1350 | 1630 |
| C9-01 | PWA284 | N/A | Al2O3 | 1100 | 0.1 | 0.35 | 23 | <1350 | <1350 |
| C9-70 | PWA284 | N/A | Al2O3 | 1100 | 10 | 0.05 | 26 | <1350 | <1350 |
| C9-62 | PWA284 | N/A | Al2O3 | 1100 | 0.1 | 0.05 | 18 | <1350 | <1350 |
| C9-04 | PWA284 | N/A | Al2O3 | 1100 | 10 | 0.56 | 17 | 1592 | 1510 |
| C9-05 | PWA284 | N/A | Al2O3 | 1100 | 0.1 | 0.4 | 18 | <1350 | <1350 |
| C9-61 | PWA284 | N/A | Al2O3 | 1100 | 10 | 0.05 | 23 | <1350 | <1350 |
| C9-77 | PWA284 | N/A | Al2O3 | 1100 | 10 | 0.05 | 25 | 2070 | 2320 |
| C9-78 | PWA284 | N/A | Al2O3 | 1100 | 10 | 0.05 | 19 | 1795 | 1825 |
| C9-79 | PWA284 | N/A | Al2O3 | 1100 | 10 | 0.05 | 23 | 2085 | 2285 |

EXAMPLE 2

Abrasive tip coatings were applied to titanium blades from the seventh stage of a military jet engine compressor in such a fashion as to provide an end cap covering the blade tip surfaces and the surfaces of the leading edges and trailing edges for a distance of about 0.050 inches from the intersections of the tip surface and the leading and trailing edges, as well as the corner portions of the convex and concave surfaces of the airfoils. These blades were then subjected to comparative testing with similar blades having no end caps, using a full scale rub rig, to determine the effects of the leading edge, trailing edge, end caps.

The titanium compressor blades comprised a titanium alloy having the nominal composition Ti-6Al-4V. The tip portion of each of the subject airfoils was masked, using plater's wax, so that the flat surface of the blade tip was exposed, along with a triangular area on each side of the airfoil at each end of the blade tip surface, each of said triangular areas bounded by the end point of the blade tip, a point located 0.050 inches from the end of the blade tip toward the center of the blade tip, and a point located 0.050 inches from the end of the blade tip toward the radially inner end of the blade along the leading or trailing edge.

The airfoil was then cleaned, by wet abrasive blasting with grit silicon dioxide, rinsed in water, and immersed in a solution containing (by volume) 95% reagent grade HCl and 5% of 70% HF for about 15 seconds. The blade was rinsed, ultrasonically cleaned for 10 seconds in deionized water, and then anodically etched for about 6 minutes at 1.4 amperes per square meter (ASM) in a solution containing (by volume) 13% HF, 83% glacial acetic acid, balance water. Another rinse was performed followed by cathodic electrodeposition of nickel in a conventional nickel sulfamate bath for 30 minutes at about 2.8 ASM. The blade was rinsed and heat treated for about 4 hours at 400° C. to improve bond strength between the plating and the substrate.

The airfoil portion of the tip was remasked, and the target portions were lightly sanded and then scrubbed with dry and wet pumice. The nickel layer was anodically etched for about 15 seconds at 2.8 ASM in a conventional acid salt solution, rinsed, and further activated by dipping in a 50 volume percent HCl solution. After rinsing, the blade tip was immersed in a conventional nickel strike solution, and cathodically plated at about 1.25 volts for 2 minutes.

Following application of the nickel strike, the airfoil was then immersed in a nickel sulfamate electroplating bath, and subsequently in a nickel-CBN slurry to deposit abrasive particulate, in accordance with the teachings of Routsis et al, US Pat. No. 5,074,970, using CBN particulate having a grit size of +100/−120 mesh. The coating was conducted so as to provide a total abrasive tip coating of about 5 mils thickness, with the majority of the particulates extending above the surface of the nickel, and 60% to 80% grit encapsulation in the nickel. The coated blade tip was then heat treated at about 370° C. for at least one hour.

Compressor blades prepared as set forth above were tested in a full scale rubbing rig to evaluate the effect upon notching, which occurs in the corner areas of the airfoil when rubbing Filled Feltmetal and PWA284 abradable seals. Test conditions were 8000 RPM, an incursion rate of 1 rail per second, and a 40 rail channel target depth. Results showed low temperatures, low rub reaction forces, 37 rail seal groove, and no blade wear. No notching was observed at leading or trailing edge corners.

Tests of conventionally prepared compressor blades, having aluminum oxide coated blade tips, were conducted against porous abradable seals, designated PWA279, and compared to similarly tested blades made in accordance with the present invention, incorporating CBN particulate, against a hard, smooth, non-porous abradable seal designated PWA284. Erosion rates of from 0.009 cc/g to 0.047 cc/g were obtained for the PWA279 abradable coating rubbed by the aluminum oxide blade tips, with a midrange of 0.028 cc/g. The harder seal material, PWA284, rubbed by the CBN abrasive blade tips with corner caps of the present invention, yielded erosion rates of 0.002 cc/g to 0.008 cc/g (nominally 0.005 cc/g), representing a substantial improvement in erosion rate.

A series of rub tests were performed in "Big Bertha", a full scale rub rig, using seventh stage seal segments (60 degree arc) coated with PWA284 abradable seal having densities of 4.5 g/cc to 5.0 g/cc, and rub depths of both 10 mils and 20 mils were run to simulate break-in rubs as well as service limit rubs. All tests were performed with electroplated CBN blade tips having 100/120 mesh size grit. The rotor used was a military engine seventh stage disk adapted to the rig, in which one test blade was installed. The combination of one blade and a 60 degree seal segment is equivalent to an engine rubbing 6 blades over a 360 degree arc. This test arrangement represents the most severe conditions the engine blades could be expected to encounter in terms of abrading the seal material. The test results are set forth in Table II, wherein Seal Density is in g/cc, Incursion Rate (I. R.) is in mils per second, Rub Depth is in mils, Load represents the rub reaction load in the Radial or Tangential direction, in pounds, and Wear represents measured blade tip wear, in mils, at Trailing Edge and Leading Edge.

TABLE II

| Test Blade | Cap? Y/N | Seal Density | I.R. | Rub Depth | Load R | Load T | Wear TE | Wear LE |
|---|---|---|---|---|---|---|---|---|
| 62F | Y | 4.5 | 0.1 | 10 | 6 | 2.5 | | |
| 63F | Y | 4.5 | 0.1 | 20 | 10 | 5 | 0 | 1 |
| 66F | Y | 4.5 | 4.6 | 10 | 10 | 5 | | |
| 67F | Y | 4.5 | 4.6 | 20 | 35 | 12.5 | 3 | 5 |
| 58F | N | 4.6 | 0.1 | 10 | 5 | 2.5 | | |
| 59F | N | 4.6 | 0.1 | 20 | 10 | 5 | 3 | 26 |
| 71F | Y | 4.6 | 0.1 | 20 | 30 | 10 | 2 | 2 |
| 52F | N | 4.6 | 4.6 | 10 | 40 | 20 | | |
| 53F | N | 4.6 | 4.6 | 20 | 65 | 40 | 4 | 21 |

From the Table, it may be seen that reaction forces increase with both increasing seal density and interaction (incursion) rate. Higher forces are expected for seals at higher densities. Rub reaction rates are a good indication of cutting ability of the abrasive tip against the abradable seal. Lower forces indicate better cutting and usually go hand in hand with lower rub temperatures and wear. Wear generally went up as either seal density or interaction rate increased. It was typical to see leading edge wear through of the CBN coating after the test. However, on blades where the corner caps of the invention were applied, i.e. where the CBN coating was wrapped around the leading and trailing edges onto the convex and concave surfaces of the airfoil, the corner caps eliminated wear through of the CBN coating at the leading edge and trailing edge sites, and kept wear uniform across the tip.

Thus, the present invention may be seen to protect the blades against premature notching, or wear through, at the leading and trailing edges, thus maintaining the presence of CBN at the leading and trailing edges and providing better cutting. This in turn leads to lower stress at the blade tip, lower temperatures, less risk of fire at the interface of the blade tip and the abradable seal, better cutting, and thus, better clearances of the blade in the seal groove. Taken as a whole, the present invention thus represents a low cost improvement for the application of abrasive to a blade tip which yields a substantial efficiency improvement.

Although this invention has been shown and described with respect to specific and preferred embodiments thereof, it will be understood by those skilled in the art that various changes and modifications therein may be made without departing from the spirit and scope of the claimed invention.

What is claimed is:

1. A sealing means for a gas turbine engine, said means comprising a plasma sprayed hard, smooth, non-porous abradable seal, and a gas turbine engine blade having a convex surface, a concave surface, a leading edge, a trailing edge and a tip surface, wherein an abrasive blade tip coating encompasses portions of the convex surface and concave surface of the blade at corners where the tip surface intersects the leading edge and the trailing edge of the blade.

2. A sealing means as set forth in claim 1, wherein said abradable seal comprises a homogeneous abradable layer plasma sprayed over a bond coat, said abradable layer comprising 50 to 65 volume percent oxidation resistant superalloy, 20 to 45 volume percent hexagonal boron nitride, and less than 25 volume percent porosity.

3. A sealing means as set forth in claim 2, wherein said blade tip coating extends for a distance of from about 0.025 to 0.100 inches from the corner of the blade down both the leading and trailing edges.

4. A sealing means as set forth in claim 3, wherein the convex and concave surfaces of said airfoil are coated with said abrasive layer in areas bounded by the end point of the blade tip, a point located on the surface of the blade tip from about 0.025 to 0.100 inches from the end of the blade tip toward the center of the blade tip, and a point located on the edge of the blade from about 0.025 to 0.100 inches from the end point of the blade tip toward the radially inner end of the blade.

5. A sealing means as set forth in claim 4, wherein the abrasive layer is applied to said blade tip surface by electroplating.

6. A sealing means as set forth in claim 5, wherein said abrasive layer comprises cubic boron nitride.

7. A sealing means as set forth in claim 6, wherein the size of said cubic boron nitride is from about 60 to 230 mesh.

8. A sealing means as set forth in claim 7, wherein said cubic boron nitride is from 100 to 120 mesh in size.

* * * * *